B. LIEBOWITZ.
FRICTION PIVOT.
APPLICATION FILED JULY 31, 1919.
1,348,020.
Patented July 27, 1920.
2 SHEETS—SHEET 2.
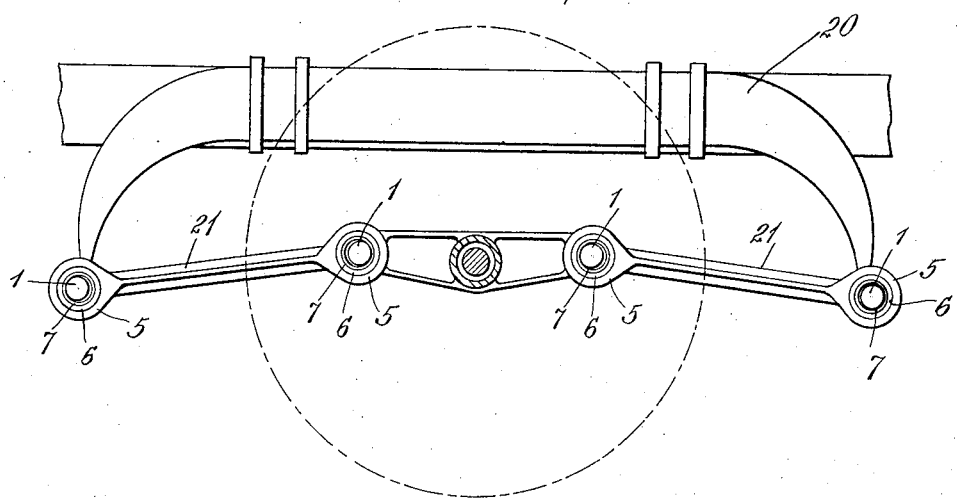
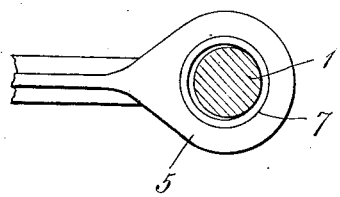
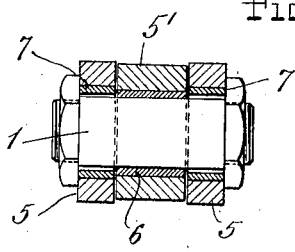
INVENTOR.
Benjamin Liebowitz
BY
ATTORNEY

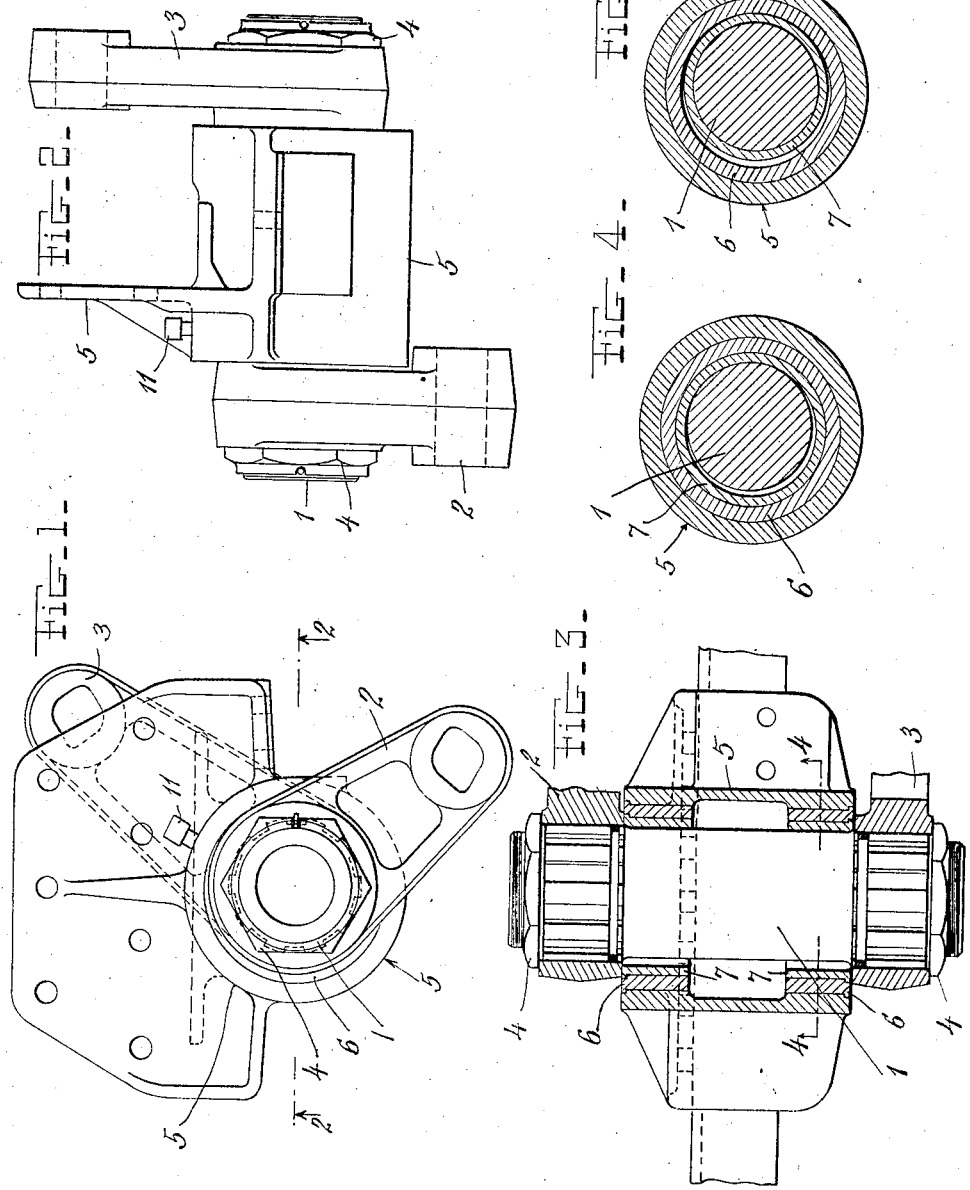

UNITED STATES PATENT OFFICE.

BENJAMIN LIEBOWITZ, OF NEW ROCHELLE, NEW YORK.

FRICTION-PIVOT.

1,348,020.

Specification of Letters Patent.

Patented July 27, 1920.

Application filed July 31, 1919. Serial No. 314,558.

*To all whom it may concern:*

Be it known that I, BENJAMIN LIEBOWITZ, a citizen of the United States, residing at the city of New Rochelle, county of Westchester, and State of New York, have invented certain new and useful Improvements in Friction-Pivots, of which the following is a specification.

My invention relates to improvements in pivots of the type shown and described in my Patent No. 1,305,815, issued June 3, 1919, wherein I have disclosed a pivot for connecting two relatively movable parts which are continuously maintained under load, in such manner as to produce rolling contact between the pivot and its bearing for small angular displacements of the connected parts, and sliding contact for larger displacements.

In said patent I have pointed out that the pivot is particularly applicable to certain types of vehicle suspensions, such, for example, as shown in my Patent No. 1240992, issued September 25th, 1917, and my copending application, Serial No. 93,837, filed April 27th, 1916, and that in such suspension it operates as a shock absorber, that is to say, it acts to quickly dampen the oscillations of the suspended body when they exceed a predetermined amplitude without introducing any objectionable friction for small displacements of the connected parts.

The object of my present invention is to separate the rolling and sliding functions of the pivot and to have them come on separate surfaces, so that the curvature of the rolling surfaces will not be appreciably changed by wear.

I accomplish this result by introducing a floating bushing between the pin and the stationary bearing, as will be hereinafter explained and pointed out in the claims.

In the accompanying drawings illustrating my invention,

Figure 1 is a side elevation of one embodiment of my invention;

Fig. 2 is an end elevation of the same;

Fig. 3 is a section on the line 2—2 of Fig. 1;

Fig. 4 is a section on the line 4—4 of Fig. 3;

Fig. 5 is a section of a modification;

Fig. 6 is an elevation of a vehicle suspension of the type described in my co-pending application, Serial No. 93,837, showing the application of my present invention thereto; and, Figs. 7 and 8 are two views showing a modified form of the pivots of Fig. 6.

Referring to Figs. 1 to 4, inclusive, 1 is a steel bar or tube, which acts as the pivot pin and to the ends of which the bell crank arms 2 and 3 are splined or fastened and retained by nuts 4. The flanged casting 5 is provided with a tubular portion into the ends of which are forced or fastened in any suitable manner the bushings or bearings 6. Sliding freely on these bushings are the floating bushings 7. The inside diameter of the bushing 7 is larger than the outside diameter of the pin 1. It will be understood that the bell crank arms are attached to parts (not shown), as for example, initially strained springs or tension members which operate to continuously maintain the pivot under load.

The action of the pivot is as follows:

For small angular displacements, the only motion of the pivot is one in which the pivot pin 1 rolls on the bushing 7. But in so doing the line of contact between the parts 1 and 7 travels around and thereby a slipping tendency is set up. Before this tendency has reached the point where the pin 1 will actually slide on the bushing 7, the said bushing will rotate (by sliding) in the bushing 6 so that the wear will come on the surfaces between the bushings 6 and 7 and not between the bushing 7 and the pin 1. It is to be understood that the coefficient of friction between the bushings 6 and 7 is smaller than that between the pin 1 and the bushing 7. To insure this, the bushing 6 may be made of bronze or other suitable material, or the surfaces between the bushings 6 and 7 may be lubricated, as by means of oil cup 11, without lubricating the surfaces between the pin 1 and the bushing 7. In general, however, due to the line contact between 1 and 7, there will be a certain amount of embedding and this will tend to raise the co-efficient of friction between 1 and 7.

In order to still further insure that the sliding will not come on the rolling surfaces, I have devised the modification shown in Fig. 5, in which the rolling occurs between the bushings 6 and 7 and the sliding between the pin 1 and the bushing 7. In this modification, the sliding surfaces are nearer to the center of the pivot than the rolling surfaces, hence sliding will occur more easily on the intended surfaces.

If desired, the co-efficient of friction between the rolling surfaces may be artificially raised, as, for example, by cutting fine parallel lines on one of the rolling surfaces or on both.

Referring now to Fig. 6, which shows my invention applied to a suspension of the character described in my co-pending application, Serial No. 93837, having an initially strained spring 20 and a pair of tension members 21. In this construction the eyes 5 of the tension members 21 take the place of the casting 5 of the preceding figures. The other parts of Fig. 6 are numbered to correspond with like parts of the preceding figures and will, therefore, be readily understood.

Referring now to Figs. 7 and 8, which show a modification of the pivots of Fig. 6, 1 is the pivot pin and 7 is the bushing on which it rolls. The bushing 7 is fastened in the eye 5 and, unlike the previous figures, does not slide therein. Instead, the pin floats on the bushing 6 which is fastened in the eye 5'. The only difference between the action of this pivot and that shown in the preceding figures is that the sliding action comes between the pin 1 and bushing 6, and the rolling action between the pin 1 and the bushing 7. This illustrates how the construction of my pivot may be modified without departing from the spirit of my invention.

From the foregoing description it will be seen that my invention comprises two pivot-pairs, one adapted for rolling and the other for sliding. For small angles of rotation the motion of the pivot is a pure rolling of the rolling pivot-pair; for larger angles the motion is a sliding of the sliding pair, the pivot being so arranged that no appreciable sliding will come on the rolling pivot-pair.

What I claim is:

1. In a friction pivot which is maintained continuously under load the combination of, a bearing, a pivot-pin eccentric in the bearing, and a bushing having tangential contact with one of the parts and circumferential contact with the other, whereby for a predetermined angle of rotation the tangential surfaces will have rolling motion and that when said angle is exceeded the circumferentially contacting surfaces will slide upon each other.

2. In a friction pivot which is maintained continuously under load, the combination of a pivot pin, a bearing, and a bushing, said elements constituting two pivot-pairs, one of said pivot-pairs being substantially of one diameter and adapted for sliding motion, the other of said pivot-pairs being adapted for rolling motion through a predetermined angle of rotation by having the inner element of the rolling pair of smaller radius than the outer, the ratio of said radii being such as to cause sliding when said predetermined angle has been exceeded.

3. In a friction pivot which is maintained continuously under load, the combination of a pivot pin, a bearing, and a bushing, said elements constituting two pivot-pairs, one of said pivot-pairs being adapted for rolling motion through a predetermined angle of rotation by having the inner element of said pair of smaller radius than the outer, the ratio of the radii being such as to cause a sliding tendency when said predetermined angle has been exceeded, the other of said pivot-pairs being adapted for sliding motion whereby the sliding tendency set up in the rolling pivot-pair will cause sliding rotation of the sliding pivot-pair, without causing any appreciable sliding in the rolling pivot-pair.

BENJAMIN LIEBOWITZ.